UNITED STATES PATENT OFFICE.

KONRAD TROBACH, OF BERLIN, GERMANY.

MANUFACTURE OF SUGAR.

SPECIFICATION forming part of Letters Patent No. 322,079, dated July 14, 1885.

Application filed February 17, 1885. (No specimens.)

*To all whom it may concern:*

Be it known that I, KONRAD TROBACH, of the city of Berlin, in the Kingdom of Prussia and German Empire, have invented certain new and useful Improvements in the Manufacture of Sugar, of which the following is a specification.

The present invention depends on the fact that saccharine solutions of sawdust, rasped or planed wood, cellulose and other fibrous matter, especially dried residuum, are absorbed in such a manner that there results an apparently dry substance containing sugar in the cells and pores nearly in the same way as natural saccharine vegetable matter.

I commence with the process of separating t e salts in the form of sulphates, being an eration not necessarily indispensable, but nevertheless useful in extracting the sugar from molasses.

I. *The separation of the salts in the form of sulphates.*—According to "Marguerite," the sulphates are separated from the molasses first by concentrating the latter to 47° or 48° Baumé, and then by adding to them about the same quantity of alcohol of eighty-five per cent., thoroughly mixed with four and a half to five per cent. of sulphuric acid of 66° Baumé. The separation of the sulphates thus formed and the other impurities mechanically mixed with the molasses from the still very impure dark-brown saccharine solution is effected by filtering-presses under a pressure of five to six atmospheres. The process carried out in this way has, however, several disadvantages. (*a*) The sulphates are held in very fine suspension in the saccharine solution. By using the ordinary filtering apparatus (pressing-cloth, felt-cloth, &c.) and the high pressure recommended by Marguerite, a considerable portion of these salts passes through the meshes of the filtering material, and, as before, renders the saccharine solution unnecessarily impure. (*b*) Notwithstanding the strong pressure, solid cakes are not obtained in the filtering-presses, but only a slimy residuum, so that a complete separation of the solution from the substances held in suspension does not take place, which causes some loss of sugar and alcohol.

The wear and tear of the filtering-cloths is very considerable, as they are greatly affected by the juices. In order to avoid these disadvantages, I proceed as follows:

First. Instead of eighty-five per cent. of alcohol, I employ only fifty to sixty per cent. of alcohol for thinning the molasses, or an equivalent quantity of alcohol of about ninety per cent. and water, mixing it thoroughly by stirring with a quantity of ordinary sulphuric acid corresponding at the utmost to the salts contained in the molasses. This quantity can be easily determined by a preliminary experiment, and had better be rather bare than in excess. The quantity of diluted alcohol can then be greater than the quantity of molasses. An equal quantity will, however, suffice to dissolve completely the sugar contained in the molasses. The thinner the solution the more easily is it filtered. Still it must not be too much reduced, since in another stage of the process thicker masses will be required, thus causing unnecessary work. Marguerite, who tried to obtain the sugar from the solution by crystallization out of strong alcohol after adding ninety-five per cent. of alcohol and considerable quantities of ground crystallized sugar, could not, of course, use alcohol of such a low grade. Even in fifty to sixty per cent. alcohol the sulphates are mostly indissoluble, and the small quantities which may be dissolved are retained in the sawdust when the latter is extracted. (*Vide* III.) By my process I can easily employ the alcohol recovered by distillation without having it rectified. The preliminary inspissation of the molasses is avoided in my process. The sulphates are formed immediately, and are gradually deposited as soon as the stirring apparatus is at a standstill.

Second. For the filtration of the juices, among which the impurities are distributed in very fine and slimy particles, I had to seek for quite a peculiar filtering material, and this I found by employing very uniform pieces of chamois-leather, which are inserted in the frames of the filtering presses or grooves, or are employed as filtering-hose. It is known that fluids can penetrate chamois-leather. The latter, however, possesses this quality in a different sense to the usual above-named filtering materials. The leather, in the first instance, becomes saturated, and then, according as on the under side water or other fluid runs off, it eagerly imbibes fresh pure fluid from the mass to be filtered without taking up in its pores the smallest undissolved particles, or allowing them to penetrate, as is the case with pressing-cloths, felt, &c. On the contrary, a pure superficial filtration takes place, and in this process it is complete and excellent. On cutting through the leather which has filtered very dirty or slimy fluids it will be found interiorly clean, and at the most dyed with coloring-matter, while the solid particles have settled on the upper surface. It is therefore much easier to cleanse and use again the chamois-leather than the pressing and filtering cloths; and, moreover, there is a considerable advantage in the durability of this material and its resistance to weak acid fluids. The sulphates form excellent manure. The excess of sulphate found in the saccharine solution after filtration is neutralized by hydrate of lime.

II. *The treatment of saccharine solutions with sawdust and other fibrous substances.*—Since the sugar must be extracted from the mixture of saccharine solution and sawdust by means of hot alcohol, it is necessary, in the first place, to remove the elements of the wood which would be soluble in alcohol by extracting them by means of hot alcohol. The material so treated can be often again employed in future operations. So much of the sawdust, &c., is now thoroughly mixed with the saccharine solution under treatment until the whole feels like an almost dry soft powder. The quantity of the sawdust is of course regulated by the strength of the saccharine solution.

When sulphates were separated from the molasses according to operation I, I found it advantageous to thicken the liquor by evaporating the alcohol, and eventually by boiling to about 35° to 40° Baumé. If the sawdust is mixed at an ordinary temperature, all the molasses will not penetrate the pores and cells. On the contrary, a certain quantity, though it may be small, will adhere to the surface of the vegetable particles. The final product, after operation III, would at length be rendered impure by the non-saccharine substances contained in such molasses. It is therefore desirable to reduce such molasses to the smallest possible compass or to remove it. For this purpose it is advisable to heat the molasses while the sawdust is being added. In this case the absorption of the saccharine solution, together with its impurities, takes place in a very complete manner, so that the sawdust retains on its surface only small insignificant quantities of the impurities. Before the following operation hot alcohol may be allowed to flow over the molasses-powder, and the molasses either recovered by distillation from this alcohol, which has only washed the molasses mechanically, or better still, the alcohol may be utilized in the above operation I for the separation of sulphates from a fresh quantity of molasses.

III. *Extraction of the sugar.*—In the solid reconstructed sacchariferous material we have at least the most important quantities (technically speaking) of the saccharine contents of the sugar-sirup, as well as the non-saccharine substances which it held in solution. The same can be extracted by hot strong alcohol (I prefer it about eighty to ninety per cent. Tralles; for starch-sugar solutions, in which only dextrine has to be eliminated, alcohol of sixty to seventy per cent. will suffice) in the way of ordinary lixiviation, as in the case of beet-root or other solid sacchariferous bodies, while the non-saccharine substances absorbed into the cells are not carried off by the strong alcohol. Of course, according to the strength of the hot alcohol, the process of lixiviation must be continued and repeated until complete. (See Scheibler's tables in the Society's Magazine, referring to the manufacture of beet-root sugar.)

The extraction of the sugar from the alcoholic solution presents no new feature, and therefore calls for no further remark. Lastly, it is known that the alcohol recovered by evaporation and inspissation can be again utilized for the extraction of saccharine substances.

It will be seen that this process is not claimed as being new, only as regards its application to solid sacchariferous vegetable substances which have been artificially transformed, and also from the fact that the non-saccharine substances remain behind.

IV. The sawdust remaining in the extraction-vessel contains the non-saccharine substances and a remnant of alcohol. If the sawdust is boiled in water and filtered, there will be obtained the substances which are soluble in water but insoluble in alcohol, and the remainder of the alcohol. The sawdust is then dried, (best and quickest in a vacuum-pan,) and can then be used again.

What I claim is—

1. The process of transforming impure saccharine solutions—such as molasses, starch-sugar solutions, and sweet-mash—into a solid sacchariferous substance by mixing the same with sawdust or other reduced vegetable matter which absorbs the solution into the pores and cells, for the purpose of obtaining sugar.

2. The preparation of the sawdust or other reduced vegetable matter for the absorption of impure saccharine solutions with a view to extracting sugar from them, and consisting in separating, by means of hot alcohol, the elements which are soluble in alcohol.

3. The lixiviation of the sugar by means of hot strong alcohol from the solid sacchariferous vegetable substance transformed by mixing impure saccharine solutions—such as molasses, starch sugar solutions, or sweet-mash—with reduced wood or other fibrous substance, the non-saccharine elements remaining behind.

4. In Marguerite's process for the separation of sulphates from the molasses, the improvement thereon obtained by treating thinned molasses with a mixture of alcohol and water of 50° to 60° degrees, instead of inspissating the molasses to 47° to 48° Baumé, and employing alcohol of eighty-five per cent.

5. The employment of chamois-leather as a filtering medium for saccharine solutions in which solid bodies are suspended in very fine particles or in the form of slime.

In testimony whereof I have signed my name to this specification in the presence of two subscribing witnesses.

KONRAD TROBACH.

Witnesses:
GOET. SCHOLLE,
ROBERT R. SCHMIDT.